US 7,679,256 B2

(12) United States Patent
Tatematsu et al.

(10) Patent No.: US 7,679,256 B2
(45) Date of Patent: Mar. 16, 2010

(54) ROTARY ELECTRIC MACHINE

(75) Inventors: Kazutaka Tatematsu, Toyota (JP);
Ryoji Mizutani, Aichi-ken (JP);
Yasuhiro Endo, Toyota (JP); Yasuhide Yagyu, Aichi-ken (JP); Nobuyuki Matsui, Kasugai (JP); Yoshiaki Kano, Okazaki (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 168 days.

(21) Appl. No.: 11/920,129

(22) PCT Filed: Jun. 10, 2005

(86) PCT No.: PCT/JP2005/011176

§ 371 (c)(1),
(2), (4) Date: Nov. 9, 2007

(87) PCT Pub. No.: WO2006/131994

PCT Pub. Date: Dec. 14, 2006

(65) Prior Publication Data

US 2009/0021095 A1      Jan. 22, 2009

(51) Int. Cl.
*H02K 1/02*     (2006.01)
*H02K 16/00*    (2006.01)
*H02K 21/12*    (2006.01)

(52) U.S. Cl. .................. 310/216.111; 310/156.38; 310/216.109

(58) Field of Classification Search .......... 310/156.38, 310/156.43–156.45, 156.49, 156.55, 156.62–156.64, 310/216.096, 216.097, 216.099–216.103, 310/216.109, 216.111, 265–266
See application file for complete search history.

(56) References Cited

U.S. PATENT DOCUMENTS

| | | | |
|---|---|---|---|
| 4,031,421 A | 6/1977 | Geiger | |
| 4,488,075 A | 12/1984 | DeCesare | |
| 5,864,197 A * | 1/1999 | Naito et al. | 310/216.109 |
| 5,894,902 A * | 4/1999 | Cho | 180/65.51 |
| 5,952,756 A | 9/1999 | Hsu et al. | |
| 6,426,577 B1 * | 7/2002 | Sekiyama et al. | 310/162 |
| 6,891,306 B1 * | 5/2005 | Soghomonian et al. | 310/216.092 |
| 7,554,241 B2 * | 6/2009 | Rao | 310/266 |

FOREIGN PATENT DOCUMENTS

| | | | |
|---|---|---|---|
| JP | 8-331816 A | | 12/1996 |
| JP | 10-271784 A | | 10/1998 |
| JP | 11-243672 A | | 9/1999 |
| JP | 2005176471 A | * | 6/2005 |
| WO | WO 03/100944 A1 | | 12/2003 |

* cited by examiner

*Primary Examiner*—Tran N Nguyen
(74) *Attorney, Agent, or Firm*—Kenyon & Kenyon LLP (57) ABSTRACT

A rotary electric machine capable of effectively utilizing both end faces of a rotor in the rotating axis direction by suppressing magnetic saturation comprises a stator having axial parts (31) and (32) and a radial part. The axial part (31) comprises cores (311) to (314) and coils (321) to (324), and the axial part (32) comprises cores (312) to (315) and coils (322) to (325). The radial part comprises cores (332) to (337) and coils (352) to (357). The width of each of the cores (311) to (315) in the circumferential direction is twice the width of each of the cores (332) to (337) in the circumferential direction. The number of windings of each of the coils (321) to (325) is equal to the number of windings of each of the coils (352) to (357).

10 Claims, 11 Drawing Sheets

ROTARY ELECTRIC MACHINE

This is a 371 national phase application of PCT/JP2005/011176 filed 10 Jun. 2005, the content of which is incorporated herein by reference.

TECHNICAL FIELD

The present invention relates to a rotary electric machine in which both end faces of a rotor in a rotating axis direction can be effectively utilized in terms of magnetism.

BACKGROUND ART

A rotary electric machine has a stator and a rotor. The rotor is formed in a substantially cylindrical shape and rotatably provided relative to the stator.

In most rotary electric machines, a stator is configured so as to oppose an outer circumferential surface of a rotor, and the rotor includes magnets magnetized in a radial direction. Further, the stator generates magnetic flux along the radial direction of the rotor and exerts the magnetic fields which effect the magnets of the rotor. Thus, in most such rotary electric machines, the rotor is rotated as a result of the stator-rotor magnetic interaction in the radial direction of the rotor.

On the other hand, a rotary electric machine comprising stators installed on the end face components of a rotor along a rotating axis direction has been known (JP 10-271784 A). In this type of rotary electric machine, the rotor includes magnets magnetized in the rotating axis direction. In addition, the stators generate magnetic flux along the rotating axis direction of the rotor and exerts magnetic fields on the magnets of the rotor. In the rotary electric machine having the stators installed on the components of the end faces of the rotor in the rotating axis direction as described above, the rotor is rotated by the stator-rotor magnetic interaction in the rotating axis direction of the rotor.

Accordingly, in order to manufacture a rotary electric machine capable of outputting high torque, it is necessary that stators, in addition to being mounted on the circumferential surface of a rotor, be mounted on both end faces of the rotor in a rotating axis direction, such that the rotor can thus be rotated by means of the stator-rotor magnetic interaction occurring in both the radial direction and the rotating axis direction of the rotor.

However, because the stators mounted on the end faces of the rotor in the rotating axis direction are placed along the radial direction of the rotor and include a core whose inner circumference is narrower than its outer circumference, the stators suffer from a problem that magnetic saturation is more likely to occur in such stators than in a stator placed opposing to a circumferential surface of the rotor. As a result, torque problematically declines in a high power range.

The present invention, which addresses the above-described problems, advantageously provides a rotary electric machine capable of making effective use of both end faces of a rotor in a rotating axis direction while suppressing magnetic saturation.

DISCLOSURE OF THE INVENTION

According to the present invention, a rotary electric machine comprises a rotor and a stator. The rotor has a first rotor magnetic pole section magnetized in a radial direction and a second rotor magnetic pole section magnetized in a rotating axis direction. The stator has a first stator magnetic pole section which is provided corresponding to the first rotor magnetic pole section to generate magnetic flux along the radial direction and a second stator magnetic pole section which is provided corresponding to the second rotor magnetic pole section to generate magnetic flux along the rotating axis direction. Then, the rotor is rotated freely relative to the stator upon receiving, at the first rotor magnetic pole section and the second rotor magnetic pole section, magnetic flux from the respective first and second stator magnetic pole sections. The first stator magnetic pole section comprises a plurality of first cores arranged along a circumferential direction of the rotor and a plurality of first coils disposed corresponding to the plurality of first cores, each of the plurality of first coils being wound around corresponding one of the first cores. The second stator magnetic pole section comprises a plurality of second cores arranged along the circumferential direction of the rotor and a plurality of second coils disposed corresponding to the plurality of second cores, each of the plurality of second coils being wound around corresponding one of the second cores. The second cores have a cross-sectional area in a plane direction perpendicular to the radial direction of the rotor which is greater than that of the first cores in a plane direction perpendicular to the rotating axis direction. Further, when a minimum width of the first cores in the circumferential direction of the rotor is defined as $W1$, the number of windings of the first coils is defined as $N1$, a minimum width of the second cores in the circumferential direction of the rotor is defined as $W2$, and the number of windings of the second coils is defined as $N2$, the relationship $W2/N2 > W1/N1$ is satisfied.

Preferably, one of either the plurality of first coils or the plurality of second coils are placed inside the coil ends of the other of either the plurality of first coils or the plurality of second coils.

Preferably, the relationship $N1 > N2$ is satisfied.

Preferably, the first coils are wound integrally with the second coils.

Preferably, the first coils are wound independently of the second coils.

Preferably, the total number of the plurality of first cores is greater than that of the plurality of second cores.

Preferably, the rotor is formed in a substantially cylindrical shape. The plurality of first cores are disposed along the circumferential direction of the rotor so as to oppose an outer circumferential surface of the cylindrical shape. The plurality of second cores comprise a plurality of first axial cores placed along the circumferential direction of the rotor so as to oppose one end face of the cylindrical shape in the rotating axis direction of the rotor and a plurality of second axial cores placed along the circumferential direction of the rotor so as to oppose the other end face of the cylindrical shape in the rotating axial direction of the rotor. The plurality of second coils comprise a plurality of first axial coils disposed corresponding to the plurality of first axial cores, each of the plurality of first axial coils being wound around corresponding one of the first axial cores, and a plurality of second axial coils provided corresponding to the plurality of second axial cores, each of the plurality of second axial coils being wound around corresponding one of the second axial cores. The plurality of first axial cores are disposed on positions displaced along the circumferential direction of the rotor relative to the plurality of second axial cores.

Preferably, the first and second axial coils are wound in a direction that is opposite to a winding direction of the first coils.

Preferably, the first and second axial coils are integrally wound with the first coils.

In the rotary electric machine according to the present invention, the rotor-stator magnetic interactions occur in both the radial direction and the rotating axis direction of the rotor, thereby causing the rotor to rotate relative to the stator. Namely, torque for rotating the rotor is generated in both the radial direction and the rotating axial direction of the rotor. In addition, a value of W2/N2 obtained by dividing the width of the second cores in the circumferential direction by the number of windings of the coils in the second stator magnetic pole section disposed so as to oppose the end face of the rotor in the rotating axis direction is greater than a value of W1/N1 obtained by dividing the width of the first cores in the circumferential direction by the number of windings of the coils in the first stator magnetic pole section disposed so as to oppose the outer circumferential surface of the rotor. As a result, the second stator magnetic pole section generates a greater amount of magnetic flux in the rotating axis direction than that generated in a case where W1=W2 and N1=N2.

Therefore, according to the present invention, magnetic saturation can be suppressed to make effective use of both end faces of the rotor in the rotating axis direction.

BEST MODE FOR CARRYING OUT THE INVENTION

Referring to the drawings, preferred embodiments of the present invention will be described in detail. In the drawings, identical or equivalent parts are designated by identical reference numerals, and descriptions related to these parts will not be repeated.

Embodiment 1

Figure 1:
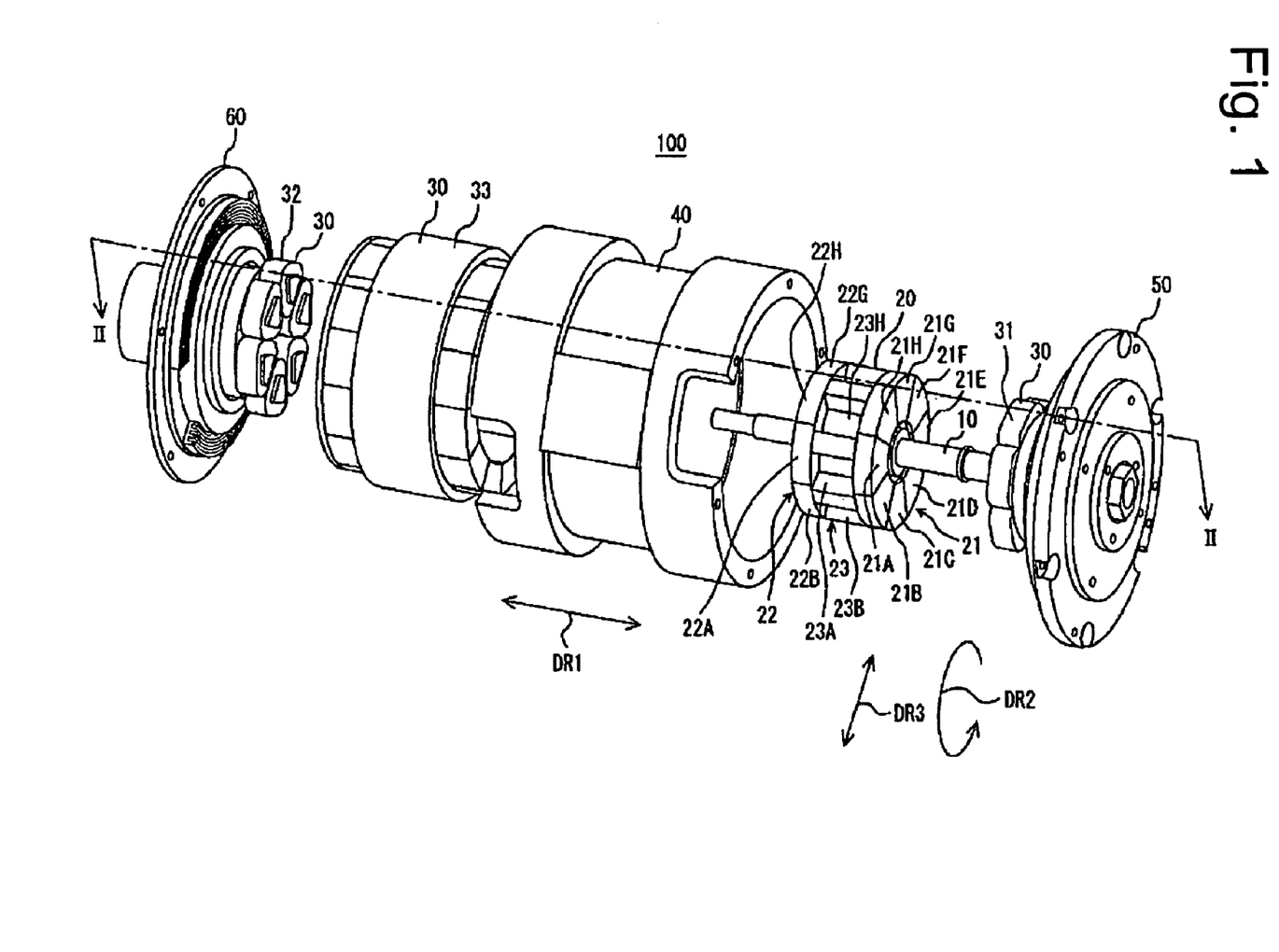
FIG. 1 is an exploded view of a rotary electric machine according to a first embodiment of the present invention.

FIG. 1 is an exploded view of a rotary electric machine according to a first embodiment of the present invention. Referring to FIG. 1, the rotary electric machine 100 according to Embodiment 1 of the present invention comprises a shaft 10, a rotor 20, a stator 30, a case 40, and covers 50 and 60.

The rotor 20 is fixed to the shaft 10. Further, the rotor 20 includes axial parts 21, 22 and a radial part 23. The axial part 21 consists of magnets 21A~21H while the axial part 22 consists of magnets 22A 22H, and the radial part 23 consists of magnets 23A~23H. It should be noted that the magnets 22C~22F and magnets 23C~23G are not illustrated in FIG. 1.

The eight magnets 21A~21H are disposed along a circumferential direction DR2 on one end face of the rotor 20 in a rotating axis direction DR1. On the other hand, the eight magnets 22A~22H are disposed along the circumferential direction DR2 on the other end face of the rotor 20 in the rotating axis direction DR1. Further, the eight magnets 23A~23H are disposed along the circumferential direction DR2 on an outer circumferential surface of the rotor 20.

The magnets 21A~21H and magnets 22A~22H are magnetized in the rotating axis direction DR1, while the magnets 23A~23H are magnetized in a radial direction DR3 of the rotor 20.

The stator 30 consists of axial parts 31, 32 and a radial part 33. The axial parts 31, 32 generate magnetic flux in the rotating axis direction DR1, while the radial part 33 generates magnetic flux in the radial direction DR3.

The shaft 10, the rotor 20, and the stator 30 are inserted into the case 40, and the covers 50, 60 are attached to both ends of the case 40 from the rotating axis direction DR1.

Figure 2:
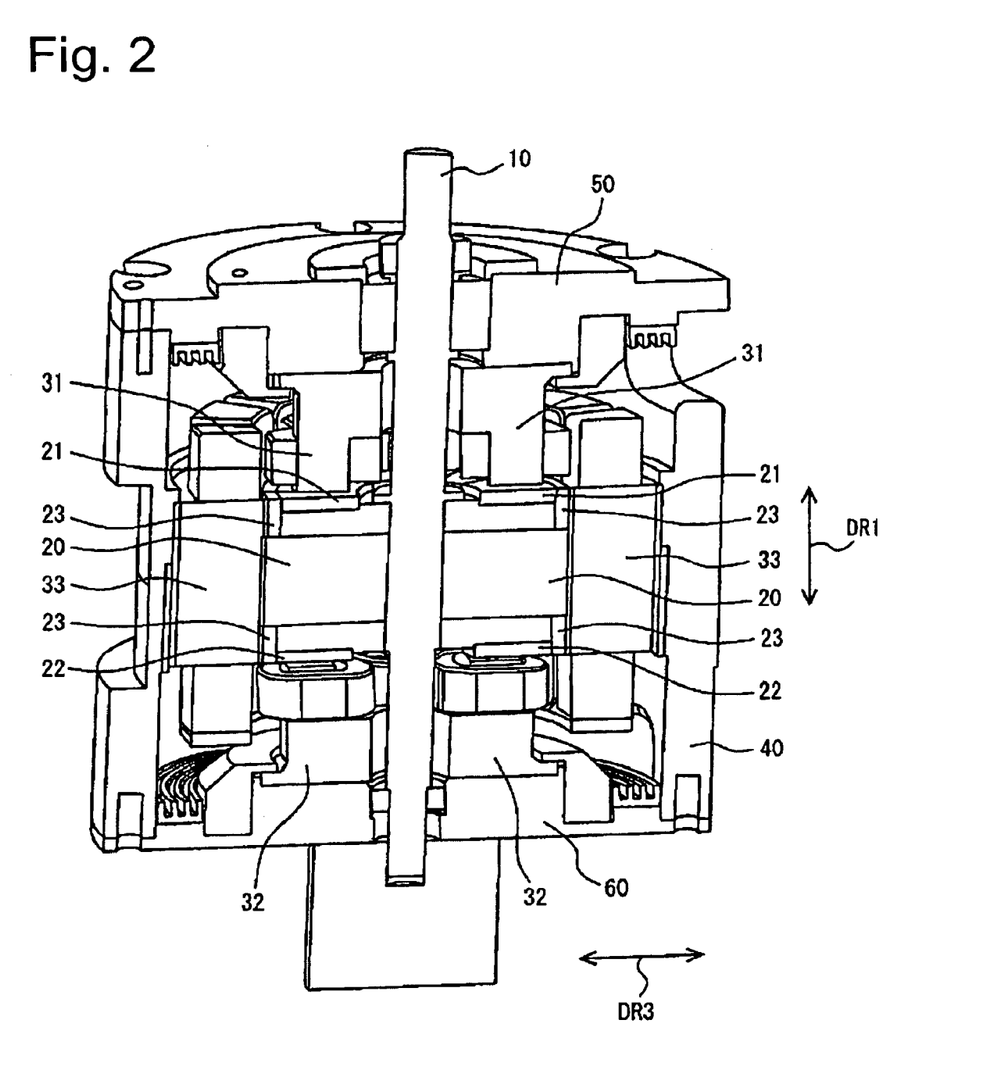
FIG. 2 is a cross-sectional view of the rotary electric machine taken along a line II-II shown in FIG. 1.

FIG. 2 is a cross-sectional view of the rotary electric machine 100 taken along a line II-II shown in FIG. 1. Referring to FIG. 2, one end face of the rotor 20 in the rotating axis direction DR1 has the axial part 21 attached thereto, and the other end face of the rotor 20 in the rotating axis direction DR1 has the axial part 22 attached thereto. In addition, the radial part 23 is located on the outer circumferential surface of the rotor 20 in the radial direction DR3.

The axial part 31 of the stator is fixed to the cover 50, and the axial part 32 of the stator is fixed to the cover 60. Then, the axial part 31 of the stator 30 is placed so as to oppose the axial part 21 of the rotor 20, while the axial part 32 of the stator 30 is placed so as to oppose the axial part 22 of the rotor 20. Further, the radial part 33 of the stator 30 is placed so as to oppose the radial part 23 of the rotor 20.

Figure 3:
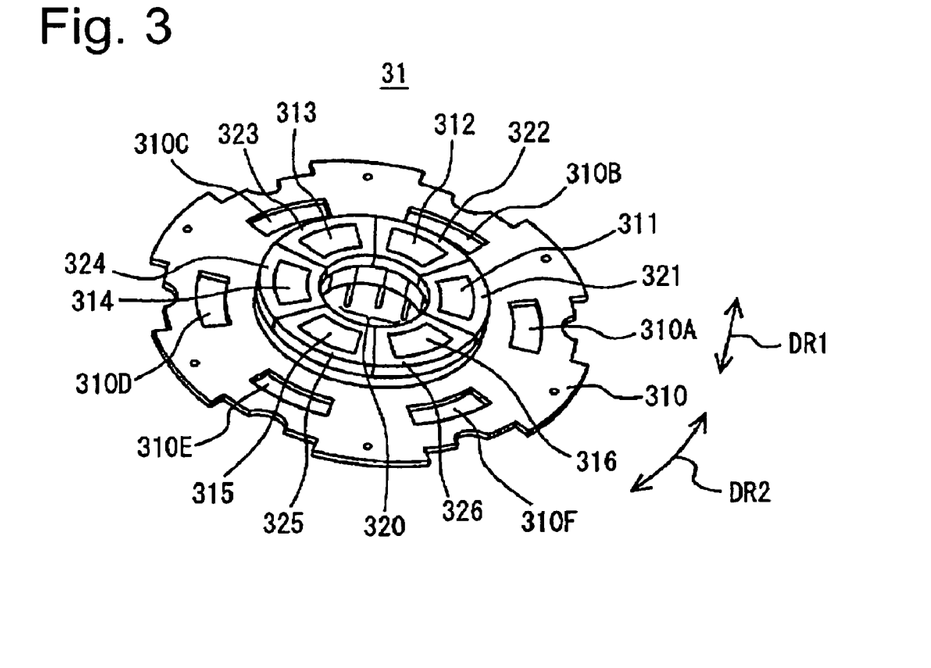
FIG. 3 is a perspective view of an axial part of a stator shown in FIG. 1.

FIG. 3 is a perspective view of the axial part 31 of the stator 30 shown in FIG. 1. The axial part 31 consists of a bracket 310, cores 311~316, and coils 321~326. The bracket 310 has holes 310A~310F, through which terminals of coils in the radial part 33, which will be described below, pass. The cores 311~316 are fixed to the bracket 310. The cores 311~316 are disposed along the circumferential direction DR2, and the coils 321~326 are wound around the cores 311~316, respectively. Further, terminals 320 are pulled out from the coils 321~326 along the rotating axis direction DR1.

It should be noted that the axial part 32 of the stator 30 shown in FIG. 1 has the structure identical to that of the axial part 31.

Figure 4:
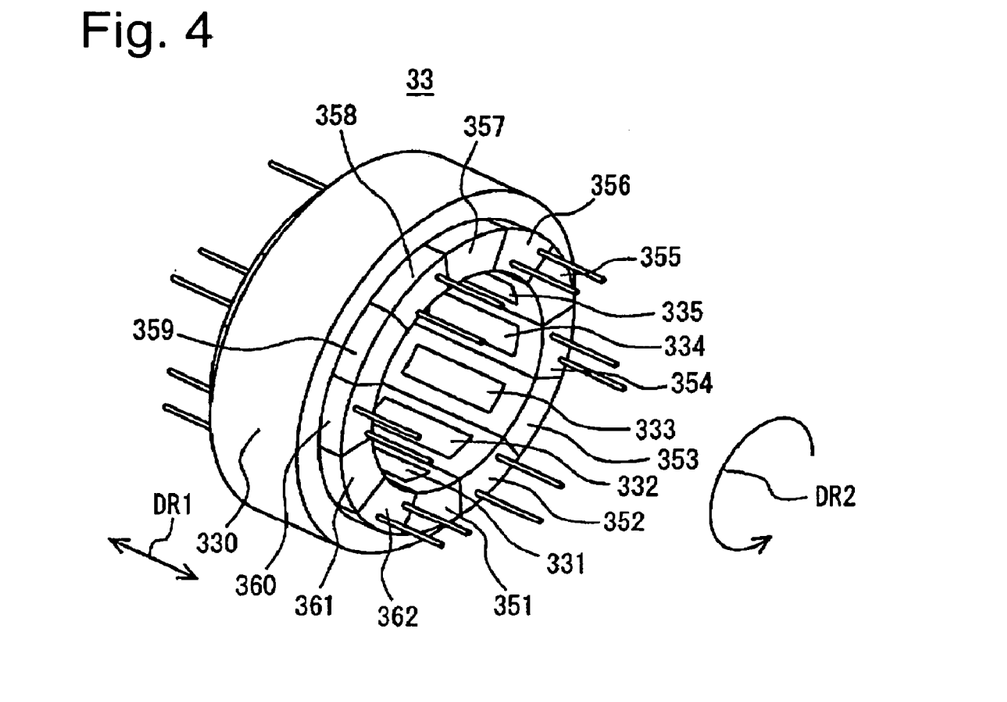
FIG. 4 is a perspective view of a radial part of the stator shown in FIG. 1.

FIG. 4 is a perspective view of the radial part 33 of the stator 30 shown in FIG. 1. Referring to FIG. 4, the radial part 33 consists of a steel plate 330, cores 331~342, and coils 351~356. Here, the cores 336~342 are not illustrated in FIG. 4.

The steel plate 330 has a structure in which a plurality of flat rolled magnetic steel sheets and strips are laminated along the rotating axis direction DR1. The cores 331~342 are fixed to an inner circumferential surface of the steel plate 330 along the circumferential direction DR2. Then, the coils 351~362 are respectively wound around the cores 331~342.

Terminals of the coils 352, 354, 356, 358, 360, and 362 are extended out towards one side of the rotating axis direction DR1, while terminals of the coils 351, 353, 355, 357, 359, and 361 are extended out toward the other side of the rotating axis direction DR1. Then, the terminals of the coils 352, 354, 356, 358, 360, and 362 are threaded through, for example, the holes 310A~310F in the axial part 31 and connected to a bus bar, while the terminals of the coils 351, 353, 355, 357, 359, and 361 are threaded through, for example, the holes 310A~310F in the axial part 32 and connected to a bus bar.

Thus, in the rotary electric machine 100, the axial parts 31, 32 of the stator 30 are composed of the six cores 311~316 and the six coils 321~326, and the radial part 33 of the stator 30 is composed of the twelve cores 331~342 and the twelve coils 351~362. In addition, the axial parts 21 and 22 of the rotor 20 are composed of the eight magnets 21A~21H and 22A~22H, respectively, and the radial part 23 of the rotor is composed of the eight magnets 23A~23H.

Figure 5:
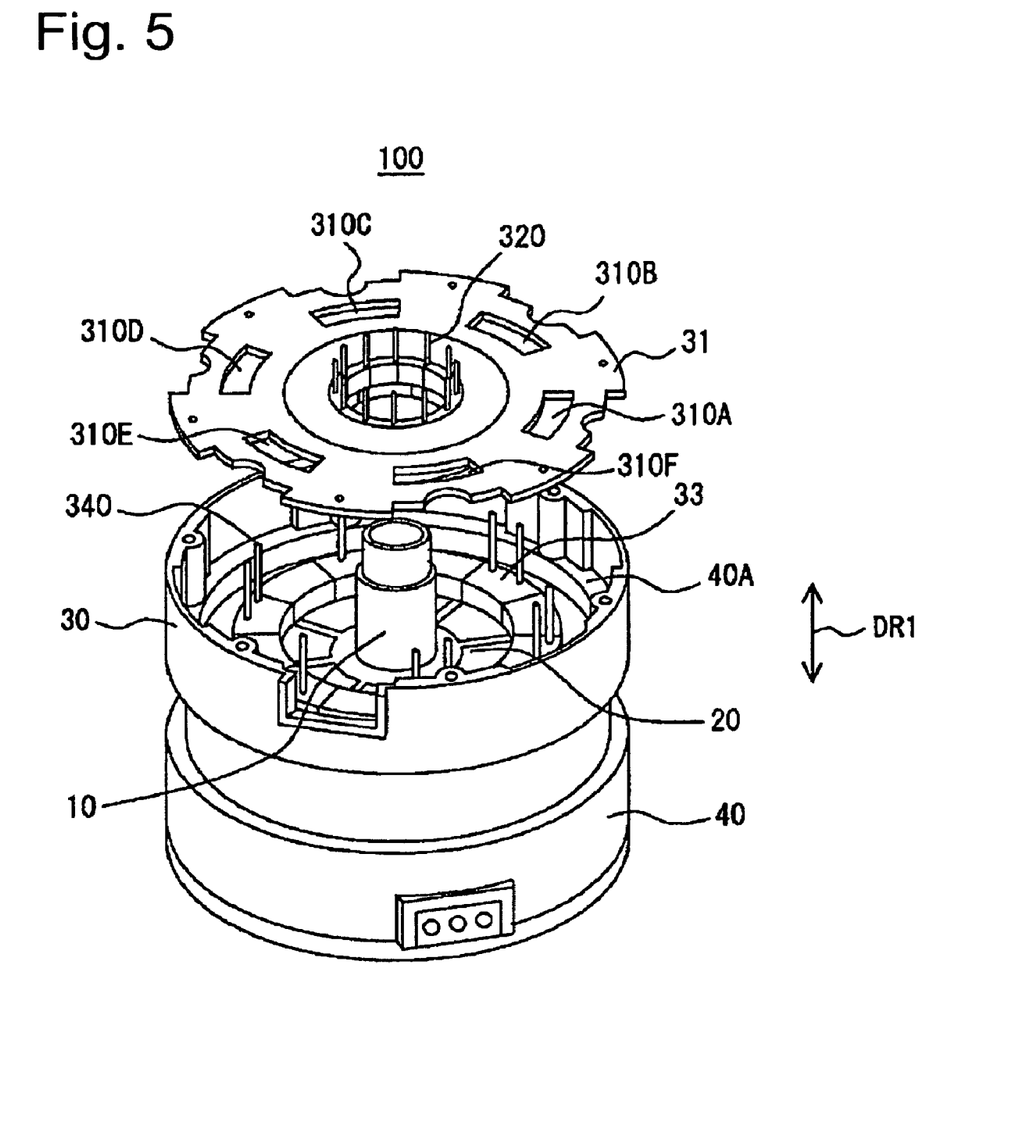
FIG. 5 is a perspective view of the rotary electric machine.

FIG. 5 is a perspective view of the rotary electric machine 100. Referring to FIG. 5, the radial part 33 of the stator 30 is placed so as to physically contact an inner circumferential surface 40A of the case 40. Then, the rotor 20 is placed inside an inner circumference of the radial part 33 of the stator 30, and the shaft 10 is placed in the center of the rotor 20. The axial part 31 of the stator 30 is housed in the case 40 from one side of the rotating axis direction DR1. In this case, the terminals 340 pulled out in the rotating axis direction DR1 from the six coils in the radial part 33 of the stator 30 are threaded through the holes 31A and others in the axial part 31.

Figure 6:
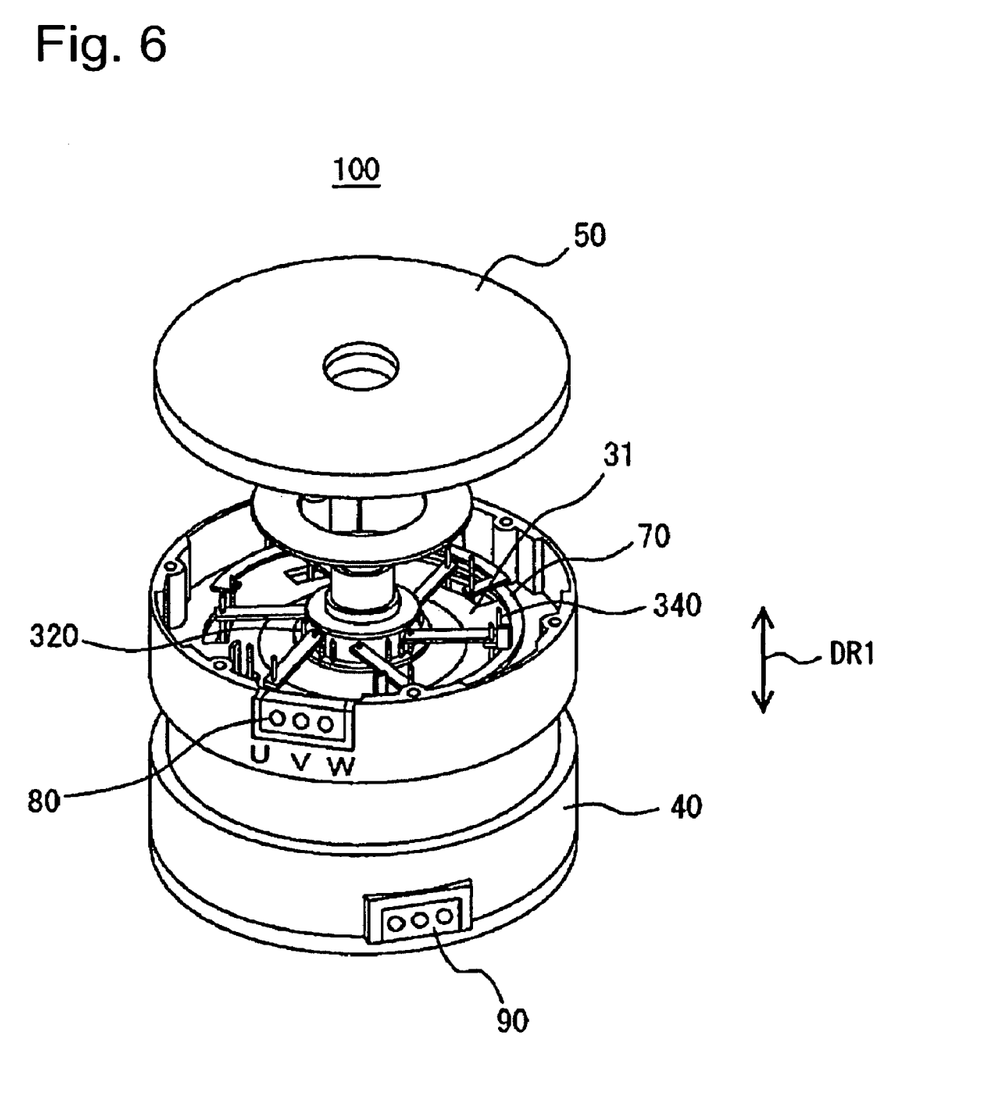
FIG. 6 is another perspective view of the rotary electric machine.

FIG. 6 is another perspective view of the rotary electric machine 100. Referring to FIG. 6, the bus bars 70 are placed on the axial part 31 of the stator 30 housed in the case 40, and the terminals 320 of the axial part 31 and the terminals 340 of the radial part 33 are connected to the bus bars 70.

A terminal 80 consists of a U-phase terminal post, a V-phase terminal post, and a W-phase terminal post, and each of the bus bars 70 is connected to the U-phase, V-phase, and W-phase terminal posts. In this manner, the terminal 80 provides electric currents to the coils in the axial part 31 and six coils out of the coils in the radial part 33. On the other hand, a terminal 90 provides electric currents to the coils in the axial part 32 of the stator 30 and the remaining six coils in the radial part 33 of the stator 30. The cover 50 is provided on an axial part 31 side of the stator 30.

Figure 7:
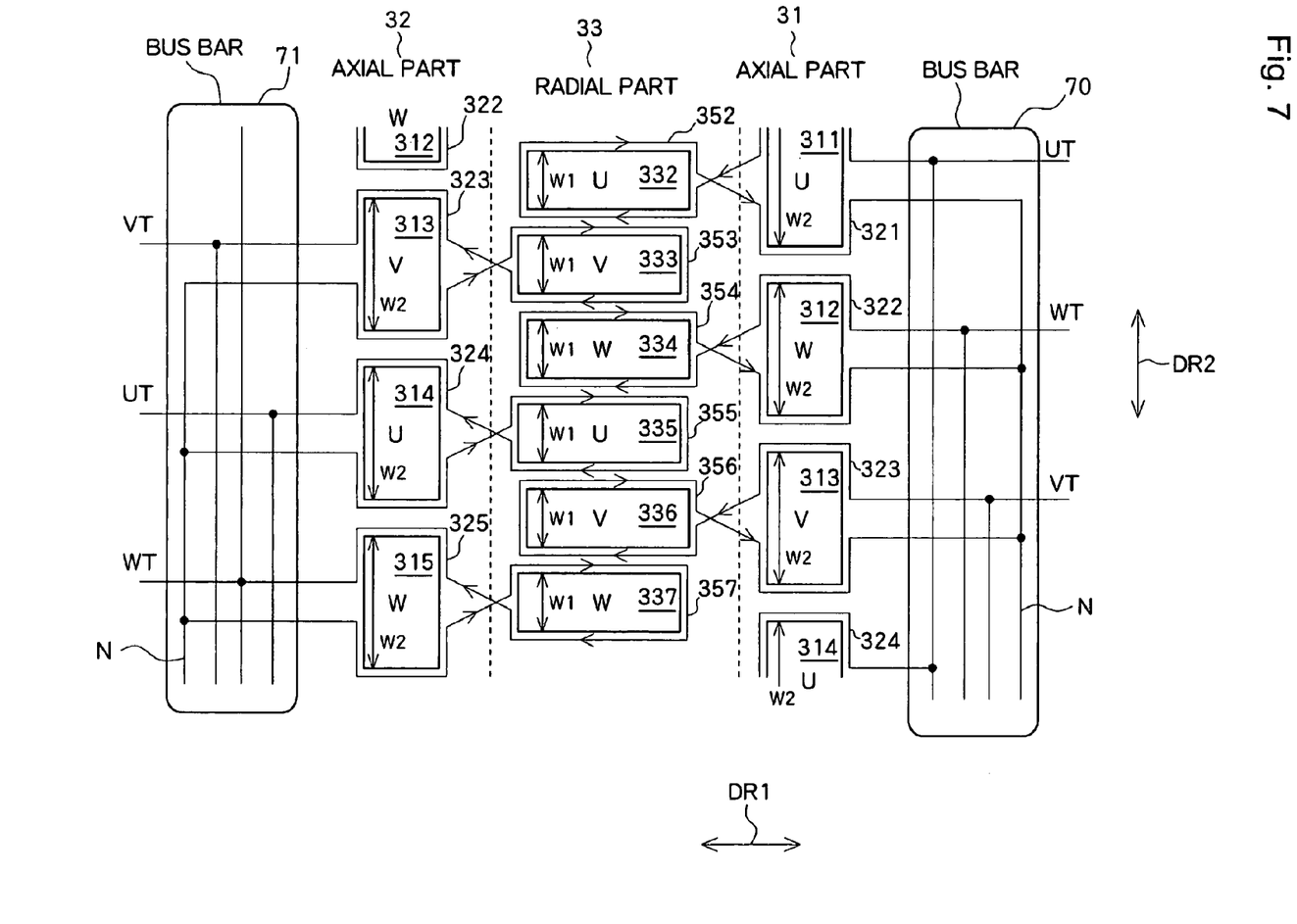
FIG. 7 is a developed view partially depicting the axial parts and the radial part of the stator shown in FIG. 1.

FIG. 7 is a developed view partially depicting the axial parts 31, 32 and the radial part 33 of the stator 30 shown in FIG. 1. Referring to FIG. 7, in the axial part 31 of the stator 30, the cores 311~314 constitute a U-phase core, a W-phase core, a V-phase core, and a U-phase core, respectively, while in the axial part 32, the cores 322~325 constitute the W-phase core, the V-phase core, the U-phase core, and the W-phase core, respectively. On the other hand, in the radial part 33 of the stator 30, the cores 332~334 respectively constitute the U-phase core, the V-phase core, and the W-phase core, and the cores 335~337 respectively constitute the U-phase core, the V-phase core, and the W-phase core.

The core 332 in the radial part 33 is provided corresponding to the core 311 in the axial part 31, the core 333 in the radial part 33 is provided corresponding to the core 313 in the axial part 32, and the core 334 in the radial part 33 is provided corresponding to the core 312 in the axial part 31. Further, the core 335 in the radial part 33 is provided corresponding to the core 314 in the axial part 32, the core 336 in the radial part 33 is provided corresponding to the core 313 in the axial part 31, and the core 337 in the radial part 33 is provided corresponding to the core 315 in the axial part 32.

Each of the cores 332~337 in the radial part 33 has a width W1 in the circumferential direction DR2, while each of the cores 311~315 in the axial parts 31, 32 has a width W2 in the circumferential direction DR2. Further, the width W2 is equal to twice the width W1.

The cores 311, 312, and 313 of the axial part 31 are arranged in such a manner that each center of the cores 311, 312, and 313 in the circumferential direction DR2 coincides with a center of a corresponding one of the cores 332, 334, and 336 of the radial part 33 in the circumferential direction DR2. The cores 313, 314, and 315 of the axial part 32 are arranged in such a manner that each center of the cores 313, 314, and 315 in the circumferential direction DR2 coincides with a center of a corresponding one of the cores 333, 335, and 337 of the radial part 33 in the circumferential direction DR2.

In addition, the coil 352 is connected to the coil 321 of the axial part 31, and the coil 321 is integrally wound with the coil 352 around the cores 311 and 332. In this case, the coils 321 and 352 are wound in the shape of figure eight along a direction shown by an arrow.

Further, the coil 353 is connected to the coil 323 of the axial part 32, and the coil 323 is integrally wound with the coil 353 around the cores 313 and 333. In this case, the coils 323 and 353 are wound in the shape of figure eight along the direction shown by the arrow.

Still further, the coil 354 is connected to the coil 322 of the axial part 31, and the coil 322 is integrally wound with the coil 354 around the cores 312 and 334. In this case, the coils 322 and 354 are wound in the shape of figure eight along the direction shown by the arrow.

Still further, the coil 355 is connected to the coil 324 of the axial part 32, and the coil 324 is integrally wound with the coil 355 around the cores 314 and 335. In this case, the coils 324 and 355 are wound in the shape of figure eight along the direction shown by the arrow.

Still further, the coil 356 is connected to the coil 323 of the axial part 31, and the coil 323 is integrally wound with the coil 356 around the cores 313 and 336. In this case, the coils 323 and 356 are wound in the shape of figure eight along the direction shown by the arrow.

Still further, the coil 357 is connected to the coil 325 of the axial part 32, and the coil 325 is integrally wound with the coil 357 around the cores 315 and 337. In this case, the coils 325 and 357 are wound in the shape of figure eight along the direction shown by the arrow.

Then, one end of the coils 321 and 352 is connected as the U-phase coil to the U-phase terminal post UT of the bus bars 70 placed on the axial part 31 side, while the other end of the coils 321 and 352 is connected to a neutral position N of the bus bars 70. Further, one end of the coils 322 and 354 is connected as the W-phase coil to the W-phase terminal post WT of the bus bars 70, while the other end is connected to the neutral position N of the bus bars 70. In addition, one end of the coils 323 and 356 is connected as the V-phase coil to the V-phase terminal post VT of the bus bars 70, while the other end is connected to the neutral position N of the bus bars 70.

On the other hand, in the axial part 32, one end of the coils 323 and 353 is connected as the V-phase coil to the V-phase terminal post VT of the bus bars 71 placed on an axial part 32 side, while the other end is connected to the neutral position N of the bus bars 71. Further, one end of the coils 324 and 355 is connected as the U-phase coil to the U-phase terminal post UT of the bus bars 71, while the other end is connected to the neutral position N of the bus bars 71. In addition, one end of the coils 325 and 357 is connected as the W-phase coil to the W-phase terminal post WT of the bus bars 71, while the other end is connected to the neutral position N of the bus bars 71.

As described above, the coils 352~357 of the radial part 33 are alternately connected to the coils 321~324 in the axial part 31 or the coils 322~325 in the axial part 32. Then, the number of windings N1 of the coils 352~357 in the radial part 33 is equal to the number of windings N2 of the coils 321~325 in the axial parts 31 and 32.

In the axial parts 31 and 32, the phases are changed in order of W phase→V phase→U phase in the circumferential direction DR2, while, in the radial part 33, the phases are changed in order of U phase→V phase→W phase in the circumferential direction DR2. In other words, the phases in the axial parts 31 and 32 change in the order opposite to that in the radial part 33. Accordingly, the coils 321~325 to be wound around the cores 311~315 in the axial parts 31 and 32 are wound in a direction opposite to a winding direction of the coils 352~357 to be wound around the cores 332~337 in the radial part 33. For this reason, when the coils are integrally wound on both the axial parts 31, 32 and the radial part 33, each pair of the coils 321 and 352; 323 and 353; 322 and 354; 324 and 355; 323 and 356, and 325 and 357 is wound in the shape of figure eight as described above. As a result of this integral winding, rotating magnetic fields can be generated in order of U phase→V phase→W phase in the axial parts 31, 32 and the radial part 33.

Further, as described above, because the cores 311~315 in the axial parts 31 and 32 have a width W2 in the circumferential direction DR2 which is twice the width W1 of the cores 332~337 of the radial part 33 in the circumferential direction DR2, and the coils 352~357 in the radial part 33 are alternately connected to the coils 321~324 in the axial part 31 and the coils 322~325 in the axial part 32, the U-phase cores (the cores 311, 314), the V-phase core (the core 313), and the W-phase core (the core 312) in the axial part 31 are placed on positions displaced along the circumferential direction DR2 relative to the U-phase core (the core 314), the V-phase core (the core 313), and the W-phase cores (the cores 312, 315) in the axial part 32.

When a current is passed through the coils 351~362, the radial part 33 of the stator 30 generates the magnetic fields in a radial direction DR3 and exerts the generated magnetic fields on the magnets 23A~23H of the rotor 20. On the other hand, when a current is passed through the coils 321~326, the axial parts 31 and 32 of the stator 30 generate the magnetic fields in the rotating axis direction DR1 and exert the generated magnetic fields on the magnets 21A~21H and 22A~22H, respectively.

Therefore, because the magnets 23A~23H are magnetized in the radial direction DR3, and the magnets 21A~21H and 22A~22H are magnetized in the rotating axis direction DR1, the magnets 23A~23H, the magnets 21A~21H, and the magnets 22A~22H interact with the magnetic fields exerted from the radial part 33, the axial part 31, and the axial part 32 of the stator 30, respectively. As a consequence, the rotor 20 is rotated about a rotating axis.

In this case, the rotor 20 is rotated about the rotating axis by both the magnetic interaction between the radial part 33 of the stator 30 and the magnets 23A~23H of the rotor 20 existing in the radial direction DR3 and the magnetic interaction between the axial parts 31, 32 of the stator 30 and the magnets 21A~21H, 22A~22H of the rotor 20 existing in the rotating axis direction DR1. Accordingly, the rotary electric machine 100 can have a torque density higher than that obtained when the rotor 20 is rotated only due to the magnetic interaction between the radial part 33 of the stator 30 and the magnets 23A~23H of the rotor 20 existing in the radial direction DR3. In addition, because torque can be generated also in both ends of the rotor 20 in the rotating axis direction DR1, there is no wasted space, leading to improvement of space utilization efficiency. In addition, because the amount of magnetic flux that leaks along the rotating axis direction DR1 from the end faces of the rotor 20 in the rotating axis direction DR1 or leaks along the radial direction DR3 from the outer circumferential surface of the rotor 20 is small, torque can be generated with a high degree of efficiency.

Figure 8:
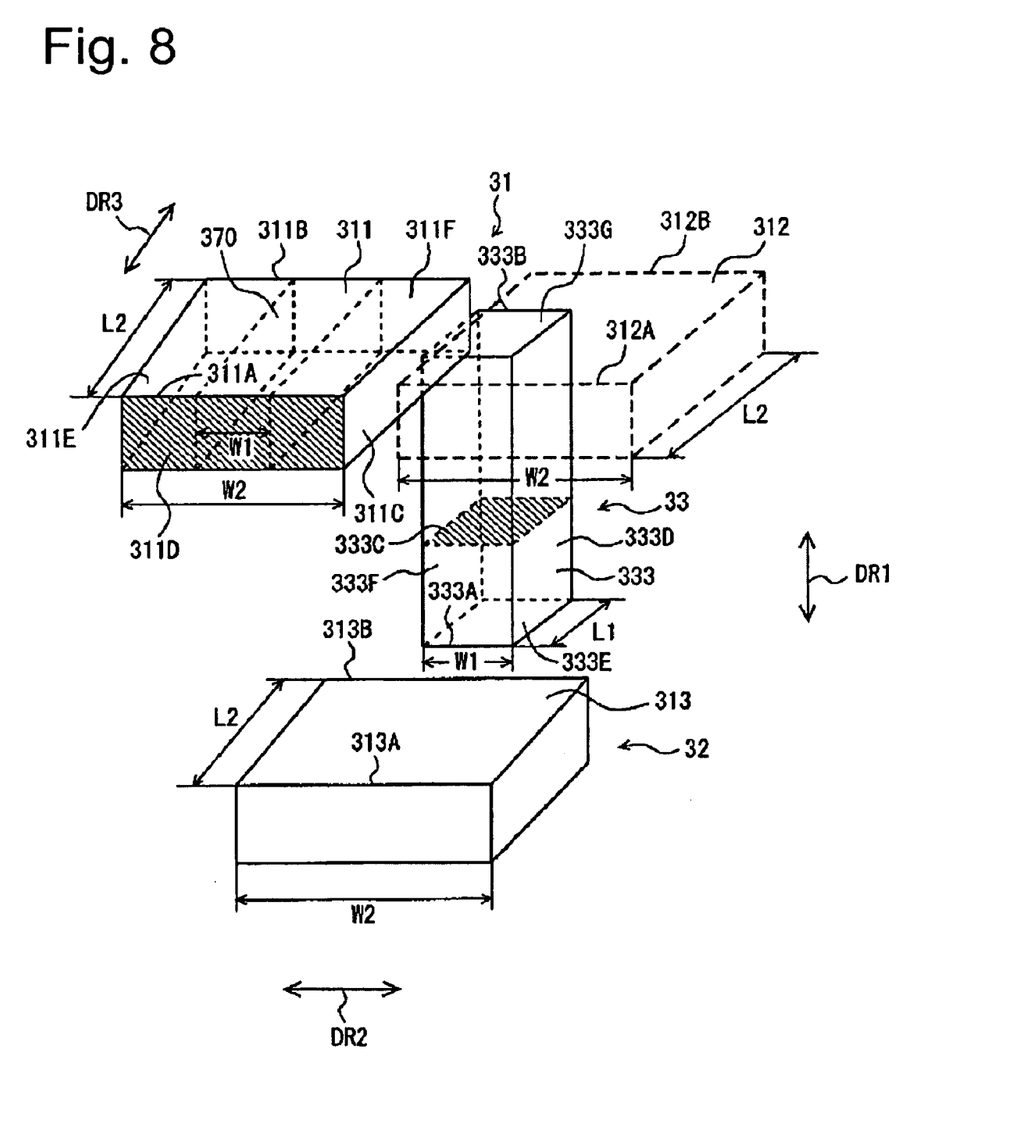
FIG. 8 is a perspective view depicting a part of the cores in the axial parts and the radial part shown in FIG. 7.

FIG. 8 is a perspective view depicting a part of the cores in the axial parts 31, 32 and the radial part 33 shown in FIG. 7. Here, in FIG. 8, the cores 311 and 312 are represented as a core of the axial part 31, the core 313 is represented as a core of the axial part 32, and the core 333 is represented as a core of the radial part 33.

Referring to FIG. 8, the core 333 of the radial part 33 has, at its innermost end 333A in the radial direction DR3, the width W1 in the circumferential direction DR2. Further, the core 333 has, at its outermost end 333B, a width which is greater than the width W1 in the circumferential direction DR2. In other words, the core 333 has a plane shape of a roughly sector broadening along the radial direction DR3. In addition, the core 333 has a length L1 in the radial direction DR3. Therefore, the width W1 is the minimum width of the core 333 in the circumferential direction DR2.

The cores 311 and 312 of the axial part 31 and the core 313 of the axial part 32 have, at the innermost ends 311A, 312A, and 313A thereof in the radial direction DR3, a width W2 in the circumferential direction DR2. Further, the cores 311, 312, and 313 have; at the outermost ends 311B, 312B, and 313B thereof, a width which is greater than the width W2 in the circumferential direction DR2. In other words, the cores 311, 312, and 313 have a plane shape of a roughly sector broadening along the radial direction DR3. Still further, the cores 311, 312, and 313 have a length L2 in the radial direction DR3. Therefore, the width W2 is the minimum width of the cores 311, 312, and 313 in the circumferential direction DR2.

The length L2 of the cores 311, 312, and 313 of the axial parts 31 and 32 is equal to a length in the radial direction DR3 of the cores of the axial parts 31 and 32 manufactured so as to have a width equal to the width W1 of the core 333 of the radial part 33 in the circumferential direction DR2. Further, when the cross-sectional area of a plane 333C perpendicular to the rotating axis direction DR1 is defined as S1 in the core 333 of the radial part 33, and the cross-sectional area of an end face 311D perpendicular to the radial direction DR3 is defined as S2 in the core 311 of the axial parts 31 and 32, S2 is greater than S1.

Accordingly, the cores 311, 312, and 313 are equivalent to a core obtained by broadening along the circumferential direction DR2 a core 370 whose width is equal to the width W1 of the core 333 of the radial part 33 in the circumferential direction DR2.

Then, the coil 321 is wound around the core 311 embracing the end faces 311C, 311D, 311E, and 311F of the core 311. The coils 322 and 323 are respectively wound around the cores 312 and 313 in a manner similar to the coil 321. Further, the coil 353 is wound around the core 333 embracing end faces 333D, 333E, 333F, and 333G.

As described above, because the number of windings N1 of the coil 353 is equal to the number of windings N2 of the coils 321, 322, and 333, the following expression (1) is satisfied:

$$W2/N2 > W1/N1 \qquad (1)$$

Namely, a value of W2/N2 obtained by dividing the minimum width W2 of the cores 311, 312 and 313 of the axial parts 31 and 32 in the circumferential direction DR2 by the number of windings N2 of the coils 321, 322, and 323 is greater than a value of W1/N1 obtained by dividing the minimum width W1 of the core 333 of the radial part 33 in the circumferential direction DR2 by the number of windings N1 of the coil 353.

Because the cores 311, 312, and 313 generate magnetic flux in the rotating axis direction DR1 when currents are passed through the coils 321, 322, and 333, magnetic saturation is less likely to occur than that occurring when the cores 311, 312, and 313 have the width W1 in the circumferential direction DR2. More specifically, because the cores 311, 312, and 313 have, at their innermost ends 311A, 312A, and 313A, the width W2 in the circumferential direction DR2 which is equivalent to twice the width W1 and have the length L2 in the radial direction DR3 which is equal to the length of the core 370, the cores 311, 312, and 313 are greater in the cross-sectional area of the plane perpendicular to the rotating axis direction DR1 than the core 370. Hence, as compared to the core 370, the cores 311, 312, and 313 are capable of generating a greater amount of magnetic flux and less likely to develop magnetic saturation. In turn, the stator 30 is less likely to develop the magnetic saturation than that in which the cores of the axial parts 31 and 32 have, in the circumferential direction DR2, the width equal to that of the cores of the radial part 33, which enables the rotary electric machine 100 to output greater torque in the high power range.

Embodiment 1 has characteristic features that the width W2 (the minimum value) in the circumferential direction DR2 of the cores 311~316 of the axial parts 31 and 32, the number of windings N2 of the coils 321~326 of the axial parts 31 and 32, the width W1 (the minimum value) in the circumferential direction DR2 of the cores 331~342 of the radial part 33, and the number of windings N1 of the coils 351~362 in the radial part 33 satisfy the above-described expression (1), and that the cross-sectional area S2 of the cores 311~316 of the axial parts 31 and 32 perpendicular to the radial direction DR3 is greater than the cross-sectional area S1 of the cores 331~342 of the radial part 33 perpendicular to the rotating axis direction DR1.

The features as described make it less likely that the axial parts 31 and 32 will develop magnetic saturation than would a configuration wherein the axial parts 31 and 32 include the core 370 having the width in the circumferential direction DR2 which is the same as the width of the cores 331~342 in the radial part 33. Consequently, the rotary electric machine 100 can output greater torque in the high power range.

Although in the above description the number of windings N1 of the coils 351~362 in the radial part 33 is equal to the number of windings N2 of the coils 321~326 in the axial parts 31 and 32, the present invention is not limited to the above-noted number of windings, and the number of windings N1 of the coils 351~362 in the radial part 33 may be greater than the number of winding N2 of the coils 321~326 in the axial parts 31 and 32. In this configuration, W2/N2 becomes much greater than W1/N1 as compared to the case where N1=N2, leading to further reduction of the occurrence of magnetic saturation in the axial parts 31 and 32.

In this case, after the coils are integrally wound around both the cores 311~316 of the axial parts 31, 32 and the cores 331~342 of the radial part 33 in the shape of figure eight, a coil may be further wound only around the cores 331~342 of the radial part 33, to thereby satisfy the relationship of N1>N2. Alternatively, the coils may be wound around the cores 311~316 of the axial parts 31 and 32 separately of the coils around the cores 331~342 of the radial part 33 so as to satisfy the relationship of N1>N2.

Further, one of either of the coils 321 or 326 of the axial part 31, 32, or the coils 351~362 of the radial part 33 may be located inside the coil ends of the other of either the coils 321~326 of the axial parts 31, 32 or the coils 351~362 of the radial part 33.

In this manner, because the remaining coils can be placed in a dead space inside the coil ends, torque can be increased without increasing the size of the rotary electric machine.

Further, the cores 311~316, cores 331~342, and the cores of the rotor 20 may be formed of magnetic dust cores.

It should be noted that the magnets 21A~21H and the magnets 22A~22H constitute "a second rotor magnetic pole section" magnetized in the rotating axis direction DR1, and the magnets 23A~23H constitute "a first rotor magnetic pole section" magnetized in the radial direction DR3.

On the other hand, the axial parts 31 and 32 constitute "a second stator magnetic pole section" provided corresponding to the first rotor magnetic pole section to generate magnetic flux along the rotating axis direction DR1, and the radial part 33 constitutes "a first stator magnetic pole section" provided corresponding to the first rotor magnetic pole section to generate magnetic flux along the radial direction DR3.

Further, the cores 311~316 in the axial part 31 constitute "a plurality of first axial cores", and the coils 321~326 in the axial part 31 constitute "a plurality of first axial coils".

Still further, the cores 311~316 in the axial part 32 constitute "a plurality of second axial cores", and the coils 321~326 in the axial part 32 constitute "a plurality of second axial coils".

Embodiment 2

Figure 9:
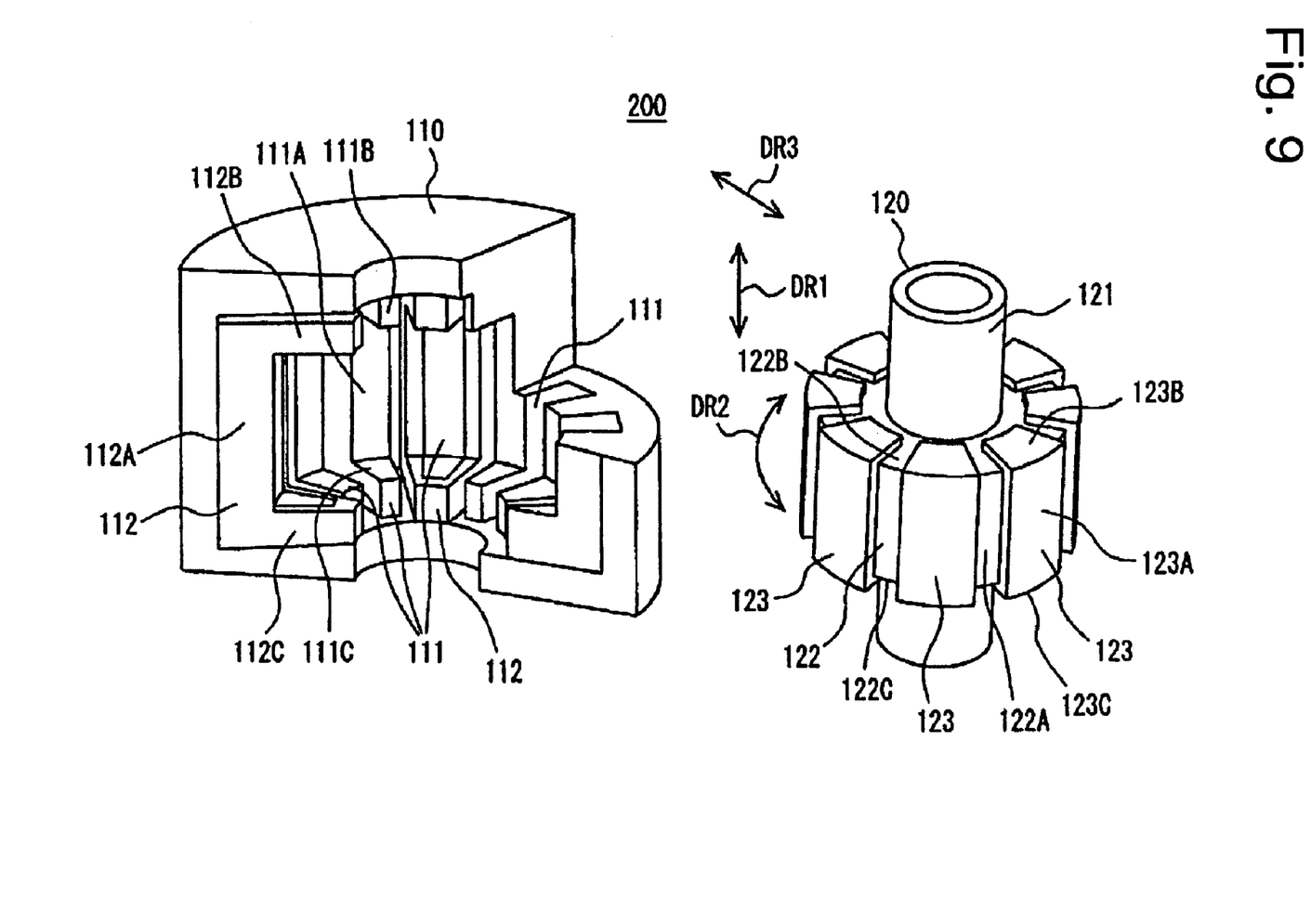
FIG. 9 is a perspective view of a stator and a rotor in a rotary electric machine according to a second embodiment.

FIG. 9 is a perspective view of a stator and a rotor in a rotary electric machine according to a second embodiment of the present invention. Referring to FIG. 9, the rotary electric machine 200 according to Embodiment 2 comprises a stator 110 and a rotor 120.

The stator 110 is formed in a substantially cylindrical hollow shape and made of a ferric material. In addition, the stator 110 includes a core 111 and a coil 112. The core 111 is integrally formed in the shape of a substantially letter C. Then, a plurality of the cores 111 are disposed at a predetermined interval along an inner wall of the stator 110.

The core 111 includes a radial part 111A and axial parts 111B, 111C. The radial part 111A is disposed along the rotating axis direction DR1 of the rotor 120, while the axial parts 111B and 111C are disposed along the radial direction DR3 of the rotor 120. In the drawing of FIG. 9, the axial part 111B is located on an upper portion of the stator 110, and the axial part 111C is located on a lower portion of the stator 110.

The coil 112 is wound around the core 111 in both the rotating axis direction DR1 and the radial direction DR3. Accordingly, the coil 112 also has the shape of a substantially letter C, and includes a radial part 112A and axial parts 112B and 112C. Because the coil 112 wound around the core 111 is contacted to the inner wall of the stator 110, it is possible to improve the ability of the coil 112 to be cooled. More specifically, the coil 112 is covered by the ferric material forming the stator 110, thereby enabling improvement in the ability of the coil 112 to be cooled.

The rotor 120 includes a rotor shaft 121, a rotor core 122, and magnets 123. The rotor core 122 has a substantially cylindrical shape and a structure in which a plurality of flat rolled magnetic steel sheets and strips are laminated along the rotating axis direction DR1 of the rotor 120. Then, the rotor core 122 is fixed to the rotor shaft 121. The magnet 123 is formed in the shape of a substantially letter C and fixed to the rotor core 122 so as to hold the rotor core 122 therein. Further, there are a plurality of the magnets 123 disposed at a predetermined interval along the circumferential direction DR2 of the rotor 120.

The magnet 123 includes a radial part 123A and axial parts 123B and 123C. The radial part 123A is protruded along the radial direction DR3 from a cylinder surface 122A of the rotor core 122. On the other hand, the axial parts 123B, 123C are protruded along the rotating axis direction DR1 from cylinder end faces 122B, 122C of the rotor core 122.

More specifically, the radial part 123A is a magnet disposed on the cylinder surface 122A of the rotor 120, while the axial parts 123B and 123C are magnets disposed on the cylinder end faces 122B and 122C which exist on both ends of the rotor 120 in the rotating axis direction DR1. Then, the radial part 123A is magnetized in the radial direction DR3, and the axial parts 123B, 123C are magnetized in the rotating axis direction DR1.

The rotor 120 is placed in a hollow portion of the stator 110. In this case, the radial part 111A of the core 111 and the radial part 112A of the coil 112 are opposed to the radial part 123A of the magnet 123, the axial part 111B of the core 111 and the axial part 112B of the coil 112 are opposed to the axial part 123B of the magnet 123, and the axial part 111C of the core 111 and the axial part 112C of the coil 112 are opposed to the axial part 123C of the magnet 123.

More specifically, the radial part 111A of the core 111 and the radial part 112A of the coil 112 are provided corresponding to the radial part 123A of the magnet 123, the axial part 111B of the core 111 and the axial part 112B of the coil 112 are provided corresponding to the axial part 123B of the magnet 123, and the axial part 111C of the core 111 and the axial part 112C of the coil 112 are provided corresponding to the axial part 123C of the magnet 123. Further, because the radial part 123A of the magnet 123 is placed, as described above, on the cylinder surface 122A of the rotor core 122, while the axial parts 123B and 123C of the magnet 123 are respectively placed on the cylinder end faces 122B and 122C of the rotor core 122, the radial part 111A of the core 111 and the radial part 112A of the coil 112 are placed so as to oppose the cylinder surface 122A of the rotor core 122, the axial part 111B of the core 111 and the axial part 112B of the coil 112 are placed so as to oppose the cylinder end face 122B of the rotor core 122, and the axial part 111C of the core 111 and the axial part 112C of the coil 112 are placed so as to oppose the cylinder end face 122C of the rotor core 122.

Figure 10:
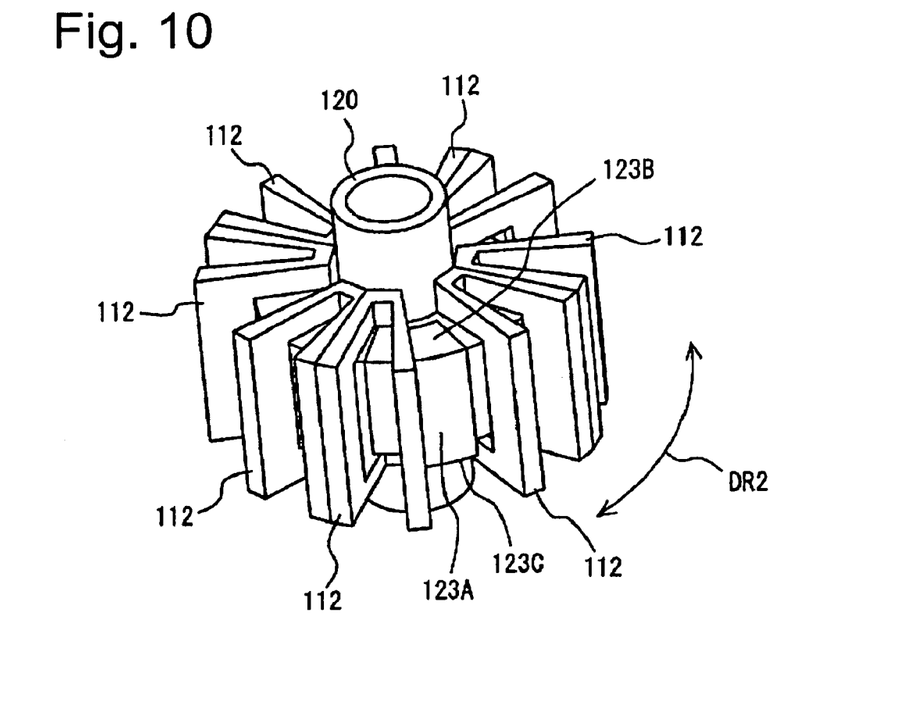
FIG. 10 is a perspective view of coils and the rotor shown in FIG. 9.

FIG. 10 is a perspective view of the coil 112 and the rotor 120 shown in FIG. 9. Referring to FIG. 10, the radial part 123A and the axial parts 123B and 123C of the magnet 123 are rotatable in the circumferential direction DR2 inside the coil 112 having the shape of the substantially letter C.

Figure 11:
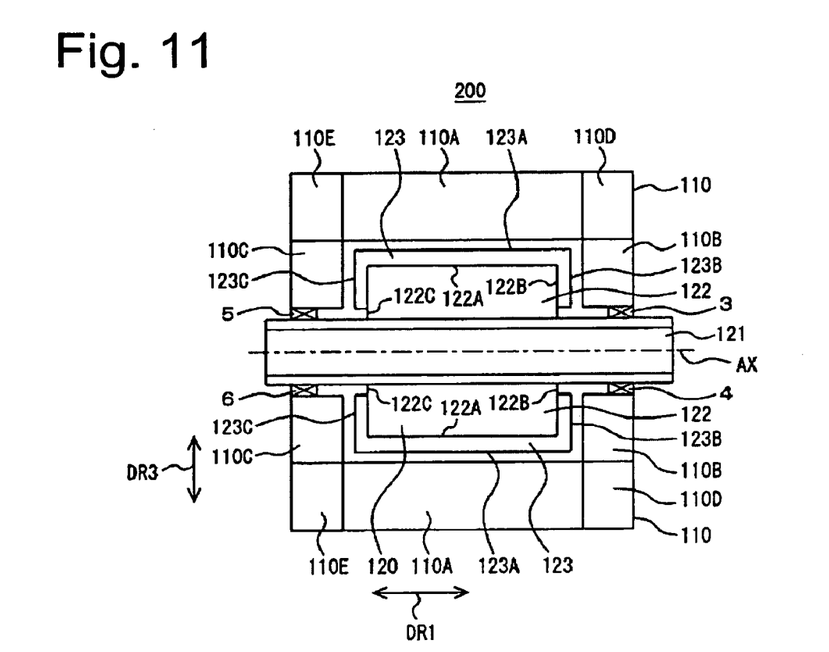
FIG. 11 is a cross-sectional view of the stator and the rotor in the rotary electric machine shown in FIG. 9.

FIG. 11 is a cross-sectional view of the stator 110 and the rotor 120 in the rotary electric machine 200 shown in FIG. 9. Referring to FIG. 11, the magnet 123 is fixed to the rotor core 122 from the radial direction DR3 of the rotor 120 so as to hold the rotor core 122 therein.

Bearings 3~6 are installed between the stator 110 and the rotor shaft 121 of the rotor 120. Then, the rotor shaft 121 is supported by the bearings 3~6. In this manner, the rotor 120 is rotatably supported by the stator 110.

The stator 110 includes the radial part 110A, the axial parts 110B and 110C, and connecting sections 110D and 110E. The radial part 110A is disposed along the rotating axis direction DR1 of the rotor 120. The axial parts 110B and 110C are disposed along the radial direction DR3 of the rotor 120. Further, the radial part 110A is opposed to the radial part 123A of the magnet, while the axial parts 110B and 110C are opposed to the axial parts 12B and 123C of the magnet 123, respectively.

The radial part 110A includes the radial part 111A of the above-described core 111 and the radial part 112A of the coil 112, while the axial parts 110B, 110C include the axial parts 111B, 111C of the above-described core 111 and the axial parts 112B, 112C of the coil 112. Therefore, when currents are passed through the coil 112, the radial part 110A generates the magnetic fields along the radial direction DR3 and exerts the generated magnetic fields on the radial part 123A of the magnet 123. Further, when currents are passed through the coil 112, the axial parts 110B and 110C generate the magnetic fields along the rotating axis direction DR1 and exert the generated magnetic fields on the axial parts 123B and 123C of the magnet 123, respectively.

Accordingly, because the radial part 123A of the magnet 123 is magnetized in the radial direction DR3, while the axial parts 123B and 123C are magnetized in the rotating axis direction DR1 as described above, the radial part 123A and the axial parts 123B and 123C respectively interact the magnetic fields generated from the radial part 110 and the axial parts 110B and 110C of the stator 110. As a result of the interaction, the rotor 120 is rotated about a rotating axis AX.

In this case, the rotor 120 is rotated about the rotating axis AX by both magnetic interaction between the radial part 110A of the stator 110 and the radial part of the rotor 120 (=the radial part 123A of the magnet 123) existing in the radial direction DR3 and magnetic interaction between the axial parts 110B, 110C of the stator and the axial parts of the rotor 120 (=the axial parts 123B, 123C of the magnet 123) existing in the rotating axis direction DR1. Therefore, it becomes possible for the rotary electric machine 200 to provide a torque density higher than that obtained when the rotor 120 is rotated only by magnetic interaction between the radial part 110A of the stator 110 and the radial part of the rotor 120 (=the radial part 123A of the magnet 123) existing in the radial direction DR3. In addition, because torque can be generated on both end faces of the rotor 120 in the rotating axis direction DR1, there is no wasted space, and the efficiency of space utilization can be further improved. Further, because the amount of magnetic flux that leaks along the rotating axis direction DR1 from the cylinder surface 122A or leaks along the radial direction DR3 from the cylinder end faces 122B and 122C is small, torque can be generated with a high degree of efficiency.

Figure 12:
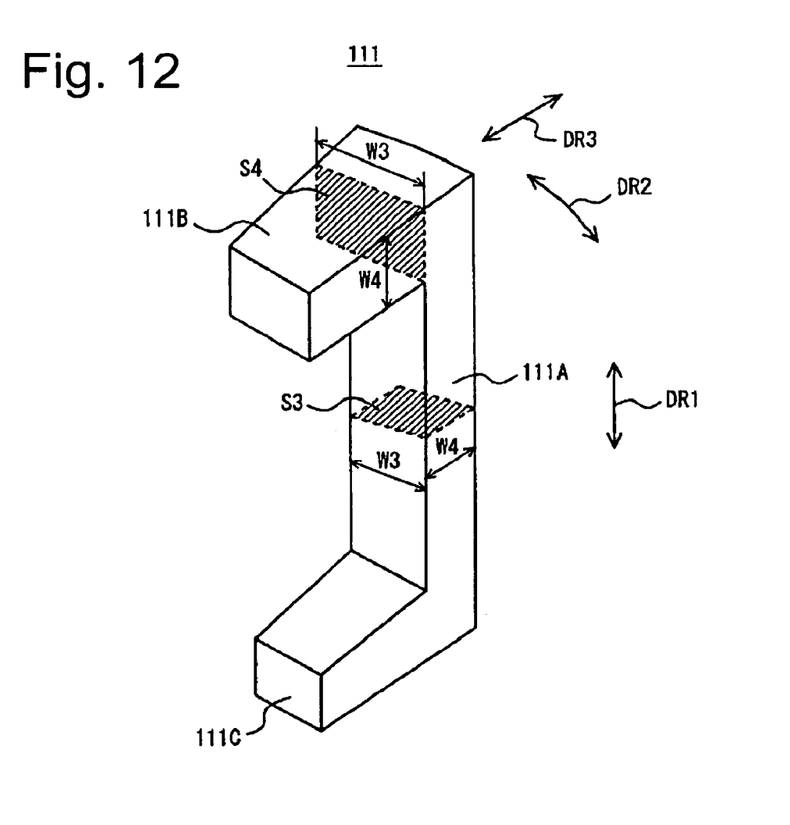
FIG. 12 is a perspective view of the core shown in FIG. 9.

FIG. 12 is a perspective view of the core 111 shown in FIG. 9. Referring to FIG. 12, the radial part 111A has, at its innermost end along the radial direction DR3, a width W3 in the circumferential direction DR2 and a width W4 in the radial direction DR3. Further, the axial part 111B abuts the radial part 111A at the innermost end of the radial part 111A in the radial direction DR3, and has, at the abutting section, the width W3 in the circumferential direction DR2 and the width W4 in the rotating axis direction DR1. The axial part 111C has the width W3 and the width W4 the same as those of the axial part 111B.

Therefore, a cross-sectional area S3 of the radial part 111A perpendicular to the rotating axis direction DR1 is equal to a cross-sectional area S4 of the axial parts 111B, 111C perpendicular to the radial direction DR3. In other words, the axial parts 111B and 111C of the core 111 have, in the radial direction DR1, the cross-sectional area S4 equal to the cross-sectional area S3 of the radial part 111A perpendicular to the rotating axis direction DR1.

Figure 13:
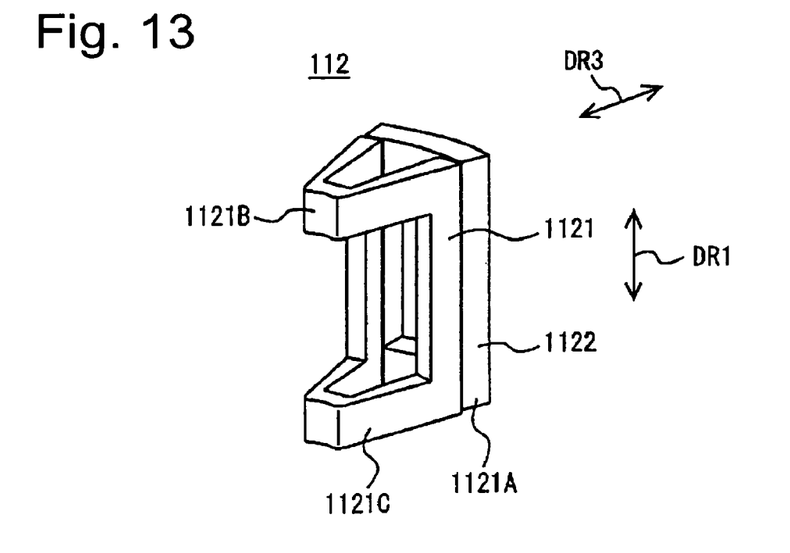
FIG. 13 is a perspective view of the coil shown in FIG. 9.

FIG. 13 is a perspective view of the coil 112 shown in FIG. 9. Referring to FIG. 13, the coil 112 is composed of coils 1121 and 1122. The coil 1121 is integrally wound in the shape of the substantially letter C from the rotating axis direction DR1 to the radial direction DR3 of the rotor 120. Further, the coil 1121 is composed of a radial part 1121A and axial parts 1121B and 1121C. In addition, the coil 1122 is wound along the rotating axis direction DR1 of the rotor 120.

The radial part 112A of the coil 112 is composed of the radial part 1121A of the coil 1121 and the coil 1122, the axial part 112B of the coil 112 is composed of the axial part 1121B of the coil 1121, and the axial part 112C of the coil 112 is composed of the axial part 1121C of the coil 1121.

Thus, because the radial part 112A of the coil 112 is composed of both the radial part 1121A of the coil 1121 integrally wound both in the rotating axis direction DR1 and in the radial direction DR3 and the coil 1122 wound in the rotating axis direction DR1, the radial part 112A of the coil 112 (=the radial part 1121A of the coil 1121 and the coil 1122) has the number of windings greater than that of the axial parts 112B (=the axial part 1121B of the coil 1121) and 112C (=the axial part 1121C of the coil 1121) of the coil 112. Namely, when the number of windings of the radial part 112A of the coil 112 is defined as N3 while the number of windings of the axial parts 112B and 112C of the coil 112 is defined as N4, a relationship of N3>N4 is satisfied.

As described above, the coil 112 has characteristic features that the coil 112 is composed of the coil 1121 integrally wound both in the rotating axis direction DR1 and in the radial direction DR3 in the shape of the substantially letter C, and that the number of winding N3 of the radial part 112A is greater than the number of windings N4 of the axial parts 112B and 112C.

Figure 14:
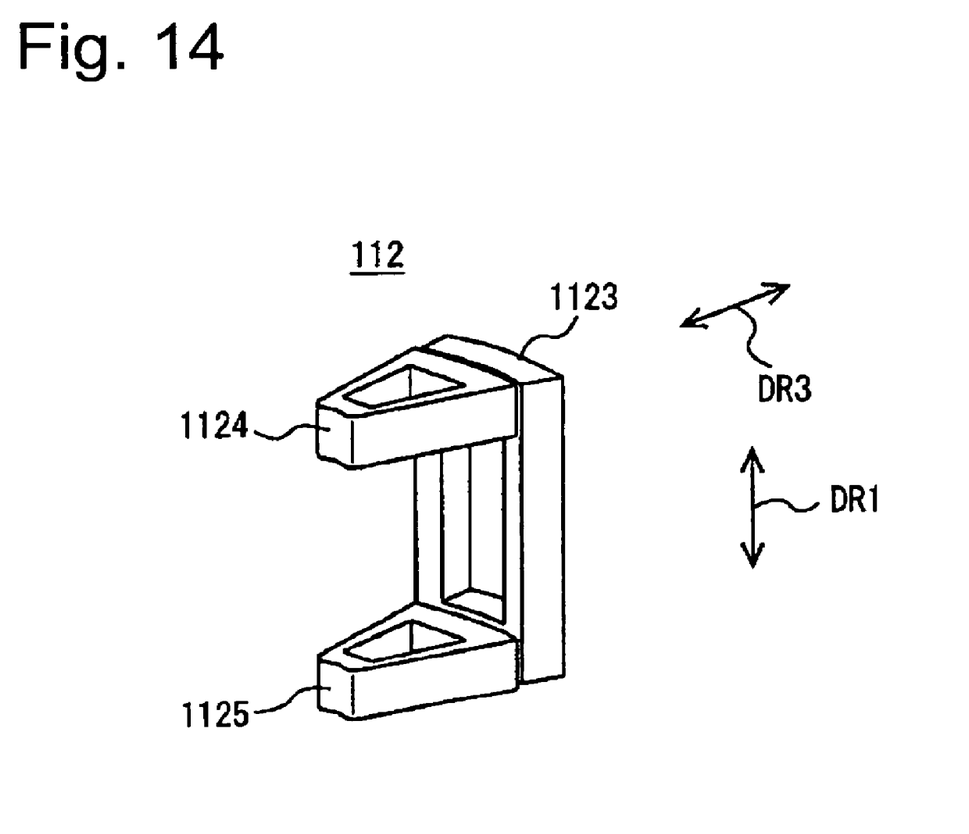
FIG. 14 is another perspective view of the coil shown in FIG. 9.

FIG. 14 is another perspective view of the coil 112 shown in FIG. 9. Referring to FIG. 14, the coil 112 is composed of coils 1123~1125. The coil 1123 is wound along the rotating axis direction DR1 of the rotor 120. The coils 1124 and 1125 are wound along the radial direction DR3 of the rotor 120. Further, the number of windings N5 of the coil 1123 is greater than the number of windings N6 of the coils 1124 and 1125.

The coil 1123 constitutes the radial part 112A of the coil 112, the coil 1124 constitutes the axial part 112B of the coil 112, and the coil 1125 constitutes the axial part 112C of the coil 112.

Therefore, even when the coil 112 is composed of the coils 1123~1125, the number of windings N5 of the radial part 112A of the coil 112 (=coil 1123) is greater than the number of windings N6 of the axial parts 112B (=coil 1124) and 112C (=coil 1125) of the coil 112.

As described above, Embodiment 2 has characteristic features that the radial part 111A and the axial parts 111B and 111C of the core 111 have the same width W3 in the circumferential direction DR2, and that the number of windings N5 of the radial part 112A in the coil 112 is greater than the number of windings N6 of the axial parts 112B and 112C.

As a result, the following expression (2) is satisfied:

$$W3/N6 > W3/N5 \quad (2)$$

In other words, the value of W3/N6 obtained by dividing the width W3 of the axial parts 111B and 111C of the core 111 in the circumferential direction DR2 by the number of windings N6 of the axial parts 112B and 112C of the coil 112 is greater than the value of W3/N5 obtained by dividing the width W3 of the radial part 111A of the core 111 in the circumferential direction DR2 by the number of windings N5 of the radial parts 112B and 112C of the coil 112.

Consequently, the axial parts 111B and 111C of the core 111 are less likely to develop magnetic saturation as compared to a case where the radial part 112A and the axial parts 112B and 112C of the coil 112 have the same number of windings.

It should be noted that the radial part 123A of the magnet 123 constitutes "the first rotor magnetic pole section" magnetized in the radial direction, while the axial parts 123B and 123C of the magnet 123 constitute "the second rotor magnetic pole section" magnetized in the rotating axis direction.

Further, the radial part 111A of the core 111 and the radial part 112A of the coil 112 constitute "the first stator magnetic pole section" provided corresponding to the first rotor magnetic pole section to generate magnetic flux along the radial direction.

Still further, the axial parts 111B and 111C of the core 111 constitute "the second stator magnetic pole section" provided corresponding to the second rotor magnetic pole section to generate magnetic flux along the rotating axis direction.

Further, a plurality of the axial parts 111B, 111B, of a plurality of the cores 111, 111, constitute "a plurality of the first axial cores".

Still further, a plurality of the axial parts 112B, 112B, . . . of a plurality of the coils 112, 112, . . . constitute "a plurality of the first axial coils".

Still further, a plurality of the axial parts 111C, 111C, . . . of a plurality of the cores 111, 111, . . . constitute "a plurality of the second axial cores".

Still further, a plurality of the axial parts 112C, 112C, . . . of a plurality of the coils 112, 112, . . . constitute "a plurality of the second axial coils".

Previously-described Embodiment 1 is characterized in that the value of W2/N2 obtained by dividing the width W2 (the minimum value) of the cores 311~316 of the axial parts 31 and 32 in the circumferential direction DR2 by the number of windings N2 of the coils 321~326 of the axial parts 31 and 32 is greater than the value of W1/N1 obtained by dividing the width W1 (the minimum value) of the cores 331~342 of the radial part 33 in the circumferential direction DR2 by the number of windings N1 of the coils 352~362 of the radial part 33, and the cross-sectional area S2 of the cores 311~316 of the axial parts 31 and 32 perpendicular to the radial direction DR3 is established so as to become greater than the cross-sectional area S1 of the cores 331~342 of the radial part 33 perpendicular to the rotating axis direction DR1.

On the other hand, Embodiment 2 is characterized in that the value of W3/N6 obtained by dividing the width W3 of the axial parts 111B and 111C of the core 111 in the circumferential direction DR2 by the number of windings N6 of the axial parts 112B and 112C of the coil 112 is greater than the value of W3/N5 obtained by dividing the width W3 of the radial part 111A of the core 111 in the circumferential direction DR2 by the number of windings N5 of the radial part 112A of the coil 112, and the cross sectional area S4 of the axial parts 111B and 111C of the core 111 perpendicular to the radial direction DR3 is established so as to become equal to the cross-sectional area S3 of the radial part 111A of the core 111 perpendicular to the rotating axis direction DR1.

Accordingly, in the present invention, the core in the axial part of the stator is formed so as to have a cross-sectional area perpendicular to the radial direction which is greater than the cross-sectional area of the core in the radial part of the stator perpendicular to the rotating axis direction, in addition to establishing the relationship that the value obtained by dividing the width of the core of the axial part in the circumferential direction DR2 by the number of windings of the axial part of the coil is greater than the value obtained by dividing the width of the core of the radial part in the circumferential direction DR2 by the number of windings of the radial part of the coil.

As configured above, the axial part of the stator is able to generate a greater amount of magnetic flux while being less likely to develop magnetic saturation as compared to a configuration wherein the axial part of the stator has a width in the circumferential direction DR2 equal to that of the radial part in the circumferential direction DR2, while the number of the windings of the axial part of the stator is equal to that of the radial part. As a result, the rotary electric machine can output greater torque in the high power range.

Further, according to Embodiment 2, one of either the radial part 112A or the axial parts 112B, 112C of the coil 112 is placed inside the coil ends of the other of either the radial part 112A or the axial parts 112B, 112C of the coil 112.

With this configuration, because dead space inside the coil ends can house the other coil, torque can be further increased without increasing the size of the rotary electric machine.

Further, the core 111 and the rotor core 122 may be formed of magnetic dust cores.

It should be noted that the rotary electric machines 100 and 200 function as a motor for driving the drive wheels of a vehicle or a power generator for generating electric power by means of rotating power of the drive wheels.

It should be understood the present disclosure of the embodiments is illustrative and not restrictive in any respect. The scope of the present invention is therefore not to be determined by the above description of the embodiments, but is to determined solely by the following claims, and various changes and modifications that fall within the spirit and scope of the claims or equivalence of such a spirit and scope are therefore intended to be embraced by the claims.

INDUSTRIAL APPLICABILITY

The present invention may be applied to a rotary electric machine capable of making effective use of both end faces of a rotor in a rotating axis direction while suppressing magnetic saturation.

What is claimed is:

1. A rotary electric machine comprising:
   a rotor having a first rotor magnetic pole section magnetized in a radial direction and a second rotor magnetic pole section magnetized in a rotating axis direction; and
   a stator having a first stator magnetic pole section which is provided corresponding to the first rotor magnetic pole section to generate magnetic flux along the radial direction and a second stator magnetic pole section which is provided corresponding to the second rotor magnetic pole section to generate magnetic flux along the rotating axis direction, wherein
   the rotor rotates freely relative to the stator upon receiving, at the first and second rotor magnetic pole sections, the magnetic flux from the respective first and second stator magnetic pole sections;
   the first stator magnetic pole section comprises,
      a plurality of first cores arranged along a circumferential direction of the rotor, and
      a plurality of first coils disposed corresponding to the plurality of first cores, each of the plurality of first coils being wound around corresponding one of the first cores;
   the second stator magnetic pole section comprises,
      a plurality of second cores arranged along the circumferential direction of the rotor, and
      a plurality of second coils disposed corresponding to the plurality of second cores, each of the plurality of second coils being wound around corresponding one of the second cores;
   the second cores have a cross sectional area in a plane direction perpendicular to the radial direction of the rotor which is greater than or equal to a cross sectional area of the first cores in a plane direction perpendicular to the rotating axis direction; and
   when a minimum width of the first cores in the circumferential direction of the rotor is defined as W1, the number of windings of the first coils is defined as N1, a minimum width of the second cores in the circumferential direction of the rotor is defined as W2, and the number of windings of the second coils is defined as N2, a relationship of W2/N2>W1/N1 is satisfied.

2. The rotary electric machine according to claim 1, wherein one of either the plurality of first coils or the plurality of second coils are placed inside the coil ends of the other of either the plurality of first coils and the plurality of second coils.

3. The rotary electric machine according to claim 1, wherein a relationship of N1>N2 is satisfied.

4. The rotary electric machine according to claim 3, wherein the first coils are integrally wound with the second coils.

5. The rotary electric machine according to claim 3, wherein the first coils are wound independently of the second coils.

6. The rotary electric machine according to claim 1, wherein the total number of the plurality of first cores is greater than that of the plurality of second cores.

7. The rotary electric machine according to claim 6, wherein:
   the rotor is formed in a substantially cylindrical shape;
   the plurality of first cores are disposed along the circumferential direction of the rotor so as to oppose an outer circumferential surface of the cylindrical shape;
   the plurality of second cores comprises,
      a plurality of first axial cores placed along the circumferential direction of the rotor so as to oppose one end face of the cylindrical shape in the rotating axis direction of the rotor, and
      a plurality of second axial cores placed along the circumferential direction of the rotor so as to oppose the other end face of the cylindrical shape in the rotating axis direction of the rotor;
   the plurality of second coils comprises,
      a plurality of first axial coils disposed corresponding the plurality of first axial cores, each of the plurality of first axial coils being wound around corresponding one of the first axial cores, and
      a plurality of second axial coils disposed corresponding to the plurality of second axial cores, each of the plurality of second axial coils being wound around corresponding one of the plurality of second axial cores; and
   the plurality of first axial cores are disposed on positions displaced along the circumferential direction of the rotor relative to the plurality of second axial cores.

8. The rotary electric machine according to claim 7, wherein the first and second axial coils are wound in a direction opposite to a winding direction of the first coils.

9. The rotary electric machine according to claim 8, wherein the first and second axial coils are integrally wound with the first coils.

10. The rotary electric machine according to claim 2, wherein a relationship of N1>N2 is satisfied.

* * * * *